April 15, 1969 W. E. STEVENS 3,438,658
PIPE JOINT EMPLOYING ENLARGED PIPE ENDS
Filed Aug. 8, 1967
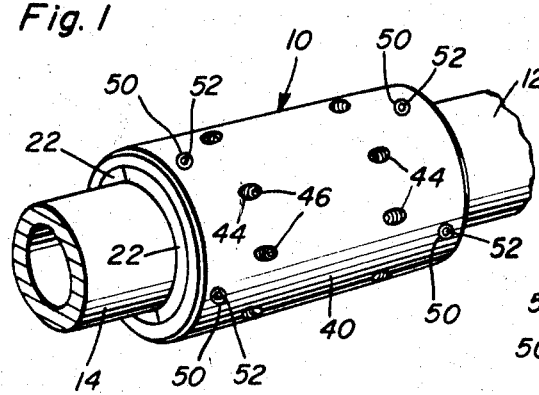
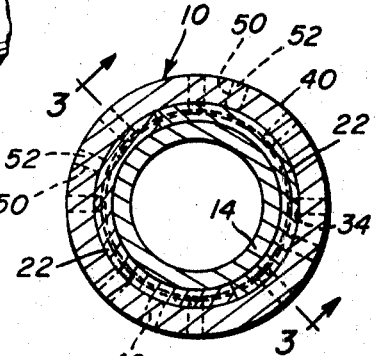
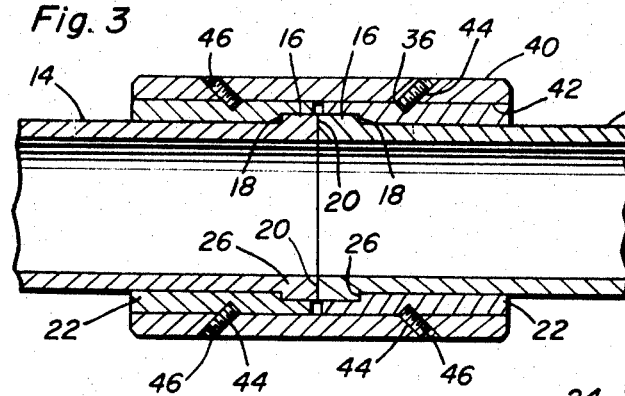
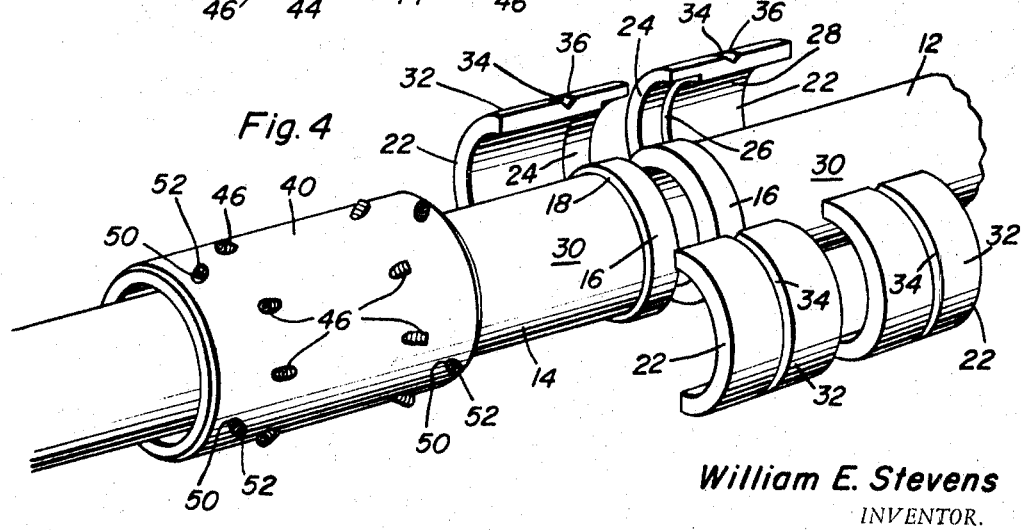
William E. Stevens
INVENTOR.

United States Patent Office 3,438,658
Patented Apr. 15, 1969

3,438,658
PIPE JOINT EMPLOYING ENLARGED
PIPE ENDS
William E. Stevens, P.O. Box HH,
Hollywood, Fla. 33022
Filed Aug. 8, 1967, Ser. No. 659,141
Int. Cl. F16l 37/14, 37/10, 21/06
U.S. Cl. 285—404                                       2 Claims

ABSTRACT OF THE DISCLOSURE

A pipe joint including an outer sleeve telescoped over end abutted end portions of adjacent pipe sections, the end portions of the adjacent pipe sections including collar segments disposed thereabout provided with opposing abutment surfaces engaged with oppositely facing abutment surfaces defined on the abutted end portions and the outer sleeve and collar portions including coacting means adjustably urging the collar portions disposed about the end abutted pipe sections toward each other and thus adjustably urging the abutted ends of the pipe sections into tight sealed engagement with each other.

---

The pipe joint has been designed to provide a means whereby a fluid-tight connection between abutted end portions of pipe sections may be provided and the adjacent ends of the pipe sections may be suitably braced against angular displacement relative to each other.

The pipe joint comprises an improvement over the pipe joint disclosed in my prior U.S. Patent No. 3,223,439, dated Dec. 14, 1965.

The main object of this invention is to provide a reliable fluid-tight pipe joint between abutted end portions of pipe sections and which will suitably brace the abutted ends of the pipe sections against angular displacement relative to each other.

A further object of this invention is to provide a pipe joint that may be readily broken and re-established in confined areas and which is suited for use in conjunction with pipe sections constructed of various materials.

A final object of this invention to be specifically enumerated herein is to provide a pipe joint which will conform to conventional forms of manufacture, be of simple construction and easy to install so as to provide a device that will be economically feasible, long lasting and relatively trouble-free in operation.

These together with other objects and advantages which wil become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a pipe joint constructed in accordance with the present invention;

FIGURE 2 is a sectional view taken substantially upon a plane passing transversely through the pipe joint;

FIGURE 3 is a fragmentary longitudinal sectional view taken substantially upon the plane indicated by the section line 3—3 of FIGURE 2; and FIGURE 4 is an exploded perspective view of the pipe joint.

Referring now more specifically to the drawings the numeral 10 generally designates the pipe joint which is utilized to establish a fluid-tight connection between a pair of end abutted pipe sections 12 and 14.

The sections 12 and 14 each include a radially outwardly projecting and circumferentially extending enlarged portion 16 on its end abutted against the other pipe section and which defines a generally radially extending shoulder surface 18. The abutted end faces 20 of the pipe sections 12 and 14 are planar and disposed normal to the longitudinal centerlines of the sections 12 and 14.

The joint 10 includes two sets of half cylindrical collars 22 with one set of collars 22 being disposed about each section 12 and 14. The half cylindrical collars 22 include relieved inner portions 24 defining abutment surfaces 26 opposing the shoulder surfaces 18 of the corresponding enlargements 16 and in which the enlargements 16 are snugly received. Further, the non-relieved portions of the collar segments 22 include inner surfaces 28 which snugly embrace and are disposed in full surface contact with the opposing outer surface portions 30 of the sections 12 and 14.

The outer cylindrical surfaces 32 of the segments 22 include circumferentially extending grooves 34 including partial truncated cone-shaped side wall surfaces 36 defining radially and outwardly inclined reaction surfaces.

An outer sleeve 40 is snugly telescoped over the two sets of collar segments 22 and encloses the entire pipe joint 10. The inner cylindrical surfaces 42 of the sleeve 40 are disposed in full contacting engagement with the cylindrical outer surfaces 32 of the collar segments 22 except for the portions thereof in which the grooves 34 are formed and the outer sleeve 40 is provided with a pair of axially spaced sets of circumferentially spaced longitudinally extending and inwardly inclined threaded bores 44 in which setscrews 46 are threadedly engaged and whose inner ends are registered with the corresponding reaction surfaces 36. Accordingly, it may be seen that upon tightening the setscrews 46, the collar segments 22 will be urged into tight compressive engagement about the outer surface portions 30 and the enlargements 16 and also axially toward each other so as to compressively engage the shoulder surfaces 18 between the abutment surfaces 26. Thus, the end faces 20 of the sections 12 and 14 are forced into tight sealed engagement with each other and the pipe sections 12 and 14 are braced against angular displacement relative to each other.

The setscrews 46 engage the adjacent end portions of the collar segments 22 and there may be, depending upon the material utilized to construct the various components of the pipe joint 10, more than absolute minimum radial clearance between the outer surface portions of the remote ends of the collar segments 22 and the opposing inner surface portions of the opposite ends of the outer sleeve 40 tending to allow more than absolute minimum relative angular displacement of one of the sections 12 and 14. Accordingly, the opposite ends of the outer sleeve 40 are provided with circumferentially spaced generally radial bores 50 in which setscrews 52 are threadedly engaged. Of course, the setscrews 52 may be tightened in order to cause the remote end portions of the collar segments 22 to clampingly grip the opposing portions of the sections 12 and 14.

Of course, although not necessary in some instances, a suitable sealing substance may be disposed between the abutted end faces 20 of the pipe sections 12 and 14.

The foregoing is considered as illustrative only of the principles of the invention.

What is claimed as new is as follows:

1. A pipe joint assembly comprising a pair of rigid pipe sections including a first pair of adjacent squared ends disposed in end-to-end abutting sealing relation and including circumferentially extending diametrically enlarged portions thereon defining circumferential generally axially facing shoulder surfaces facing away from said first pair of ends, two sets of arcuate partial cylindrical elongated collar segments, each of said pipe sections having one set of said collar segments disposed thereabout with the segments of each set of segments defining collar means extending substantially completely about and snugly embracing the corresponding pipe section, said collar means on each pipe section including means defining a circumferentially extending and radially inwardly and axially outwardly opening relieved area in which the corresponding diametrically enlarged portion is snugly received and defining an axially outwardly facing circumferential abutment surface opposing and disposed in surface to surface abutting contact with the corresponding shoulder surface, the adjacent ends of said collar means being at least slightly axially spaced apart, an outer sleeve including first and second end portions snugly telescoped over said sets of collar segments, said first and second end portions each including a pair of first and second axially spaced sets of circumferentially spaced thrust applying means overlying the inner and outer axially spaced end portions, respectively, of the corresponding set of collar segments, the second sets of thrust applying means being operable to thrust radially inwardly on the opposing outer end portions of said collar segments and the first sets of thrust applying means of said sleeve being operable to thrust radially inwardly on the opposing inner end portions of said collar segments with an axial component as well as a radial component, whereby said first sets of thrust applying means will urge said sets of collar segments axially and radially toward each other and thus said squared ends tightly sealingly together and said first and second sets of thrust applying means coact with each other to tightly clamp said collar segments about said pipe sections to strongly brace the latter against relative angular displacement about a transverse axis.

2. The combination of claim 1 wherein said thrust applying means include means applying inward thrusts on each end of each collar segment on at least two points spaced circumferentially thereabout.

References Cited

UNITED STATES PATENTS

| 3,028,180 | 4/1962 | Smith | 285—404 X |
| 3,223,439 | 12/1965 | Stevens | 285—373 |
| 3,134,615 | 5/1964 | Cator | 205—404 X |

FOREIGN PATENTS

| 1,292,343 | 3/1962 | France. |
| 457,427 | 3/1928 | Germany. |

CARL W. TOMLIN, *Primary Examiner.*

DAVE W. AROLA, *Assistant Examiner.*

U.S. Cl. X.R.

285—417